Nov. 10, 1964 E. L. ROBACK 3,156,776

WAYSTATION TELEPHONE SYSTEM

Filed Aug. 15, 1962 7 Sheets-Sheet 1

INVENTOR.
Edward L. Roback

BY C. A. Gulbrandsen
Atty.

INVENTOR.
Edward L. Roback
BY C. A. Gulbrandsen
Atty.

INVENTOR.
Edward L. Roback
BY C. A. Gulbrandsen
Atty.

Nov. 10, 1964 E. L. ROBACK 3,156,776

WAYSTATION TELEPHONE SYSTEM

Filed Aug. 15, 1962 7 Sheets-Sheet 4

INVENTOR.
Edward L. Roback

BY C. A. Gulbrandsen
Atty.

WAYSTATION TELEPHONE SYSTEM

Filed Aug. 15, 1962 7 Sheets-Sheet 5

INVENTOR.
Edward L. Roback
BY [signature]
Atty.

INVENTOR.
Edward L. Roback
BY
C. A. Gulbrandsen
Atty.

INVENTOR.
Edward L. Roback
BY C. A. Gulbransen
Atty.

United States Patent Office 3,156,776

Patented Nov. 10, 1964

3,156,776

WAYSTATION TELEPHONE SYSTEM

Edward L. Roback, Chicago, Ill., assignor to Automatic Electric Laboratories, Inc., Northlake, Ill., a corporation of Delaware Filed Aug. 15, 1962, Ser. No. 217,072
8 Claims. (Cl. 179—17)

This invention relates in general to a waystation telephone system and specifically to a system including a waystation telephone line linked to a standard telephone system in such a manner that calls may be made back and forth between waystations on the waystation line or between waystations and regular subscribers of the telephone system.

The object of the present invention is to provide equipment for the selective signalling of a single waystation without signalling the remaining waystations on a waystation line.

A first feature of the instant invention is the inclusion of circuitry for selectively transmitting a plurality of tone signals over a waystation line connected to a plurality of waystations for signalling but one of the waystations.

Another feature is the inclusion of equipment at each waystation that will operate in response to receipt of an incoming tone signal to condition the waystation for receipt of additional signals.

Still another feature shall be the provision of equipment at each of said waystations that will provide a signal in response to receipt of a plurality of incoming signals received after conditioning.

A final feature shall be the inclusion of switching equipment that may be operated by a waystation to signal another waystation without utilizing standard telephone switching facilities.

In the present arrangement an oscillator is provided in the dialing circuit of each waystation which may be controlled to generate alternating currents of either 1500 cycles or 2000 cycles. A dial key is provided to cause the oscillator to transmit 1500 cycles over the line to operate the detector to seize the control circuit at the telephone exchange. After dial tone is received the standard calling device in the dialing circuit is operated to cause the oscillator to transmit pulses of 2000 cycles to the control circuit to operate a pulse detector therein. This in turn controls a rotary switch where initial selection between placing a call to the regular telephone exchange or back over the waystation line is made by dialing an appropriate digit. After this selection is made incoming dial pulses from the waystation control the line circuit of the telephone exchange to send regular pulses thereover to operate the automatic switches at the exchange to select the called party therein, or they may operate the switching equipment associated with the waystation line for the selection of signalling of another waystation on the same line. In the case of calls from the telephone exchange to substations on the waystation line, a terminal is provided in the exchange which may be seized by automatic switches to connect with the waystation line. A relay in the waystation control circuit associated with this terminal is operated by dial pulses to operate the waystation control circuit to select and signal the desired waystation.

Having given a general description of the system I will now describe the various features in detail by reference to the accompanying drawings in which.

FIGURES 3, 4, 5, 6 and 7 taken in combination comprise a schematic diagram of the waystation control circuitry of the instant invention.

Figure 8:
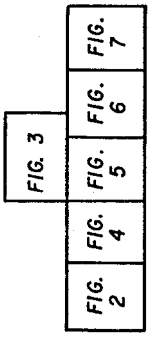

FIGURE 8 shows the manner in which FIGURES 2, 3, 4, 5, 6 and 7 should be arranged for understanding of the invention.

Figure 1:
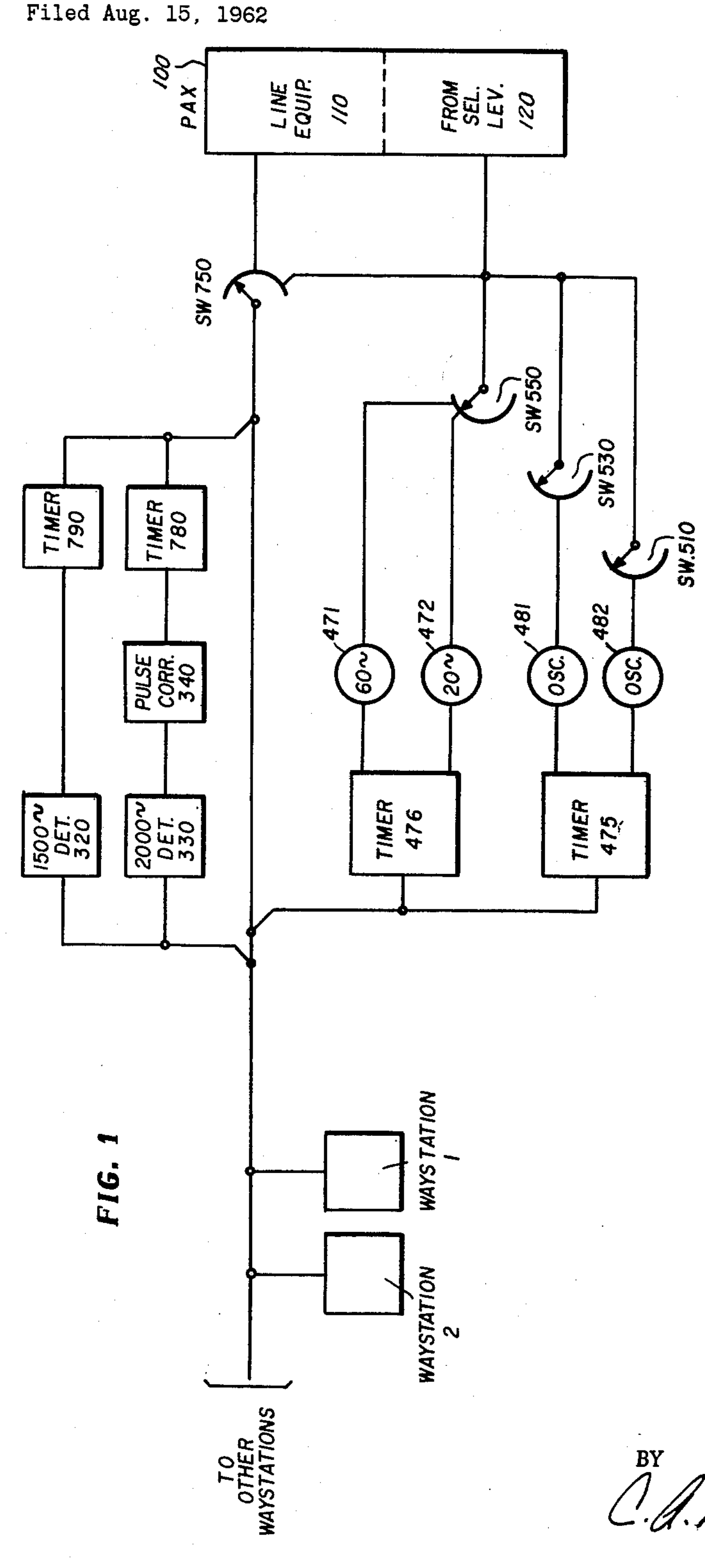
FIGURE 1 is a block diagram of a waystation line connected to a waystation control circuit terminating in a telephone exchange or PAX, and shows by means of blocks, various equipment used in receiving and making calls to and from the waystation line.

Referring first to FIG. 1, a subscriber at waystation 1 will operate a key to momentarily transmit a signal frequency of 1500 cycles if the line is not busy. This signal is detected by the 1500 cycle detector 320 which will extend the circuit connection to switch SW750. When this connection is completed the subscriber will dial a preliminary digit to selectively access either the line equipment 110 or another waystation on the waystation line by means of switches SW550, SW530 and SW510. If it is the subscriber's desire to converse with a subscriber normally associated with the PAX 100 the subscriber at waystation 1 will dial the selected digit, such as 9. Switch 750 will operate in response to the digit dialed by waystation 1 and complete a circuit connection to line equipment 110 of PAX 100. When this connection is completed the usual incoming dial tone will be returned via switch 750 and the waystation line to waystation 1, indicating to the subscriber that he may now proceed to dial the PAX station with which he wishes to converse.

If the subscriber at waystation 1 desires to converse with another waystation on the waystation line such as waystation 2, he will seize switch SW750 in a manner previously described but will now gain access to switches SW550, SW530 and SW510 by dialing a selected digit such as "0." The waystation subscriber will now dial the three digit code assigned to waystation 2. By means of the first digit dialed the switch SW550 will cause either the 60 cycle oscillator 471 or the 20 cycle oscillator 472 to operate and transmit a tone of the respective frequency over the waystation line. A traffic ringer at waystation 2 will respond to receipt of one of these frequencies to condition the signal receiving equipment at waystataion 2 to receive further incoming signals. The subscriber at waystation 1 will now operate the dial to transmit a next digit to select oscillator 481 and enable it to operate at a specific frequency to transmit a tone of that frequency over the waystation line. The dialing of the last digit by the subscriber at waystation 1 will operate switch SW510 to enable oscillator 482 to operate at a second frequency different from oscillator 481 and transmit this tone over the waystation line. A resonant reed relay at waystation 2 designed to operate in response to receipt of two different tone signals will now operate if those two signals are present on the waystation line, to signal the subscriber at waystation 2.

If a subscriber at the PAX 100 wishes to converse with any of the subscribers on the waystation lines such as waystation 1 or 2, he will dial a code assigned to the waystation line and as such access the switches SW550, SW530 and SW510 via the selector 120 of PAX 100. The PAX subscriber will now dial a three digit code to signal the waystation subscriber, operating switches SW550, SW530 and SW510 to transmit first either a 60 cycle or a 20 cycle tone and then two other tones of selected and different frequencies to signal the desired waystation.

The timers 790 and 780 disconnect the associated equipment if the placing of a call between a waystation and the PAX or between two waystations is not completed for any reason. The timers 475 and 476 determine the duration of signals applied to the waystation lines by oscillators 471, 472, 481 and 482.

Figure 2:
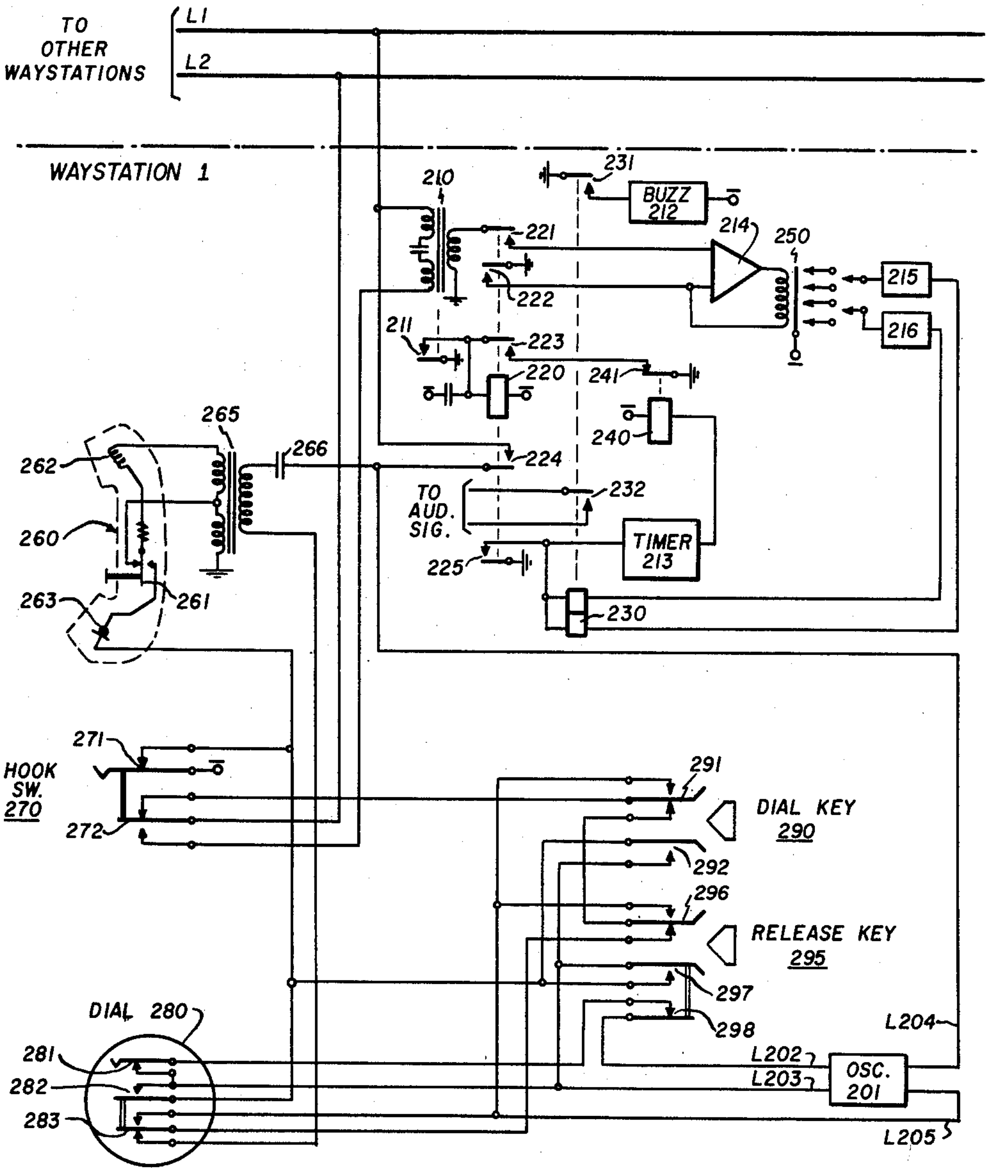
FIGURE 2 is a schematic diagram of the circuit in an individual waystation.
Figure 3:
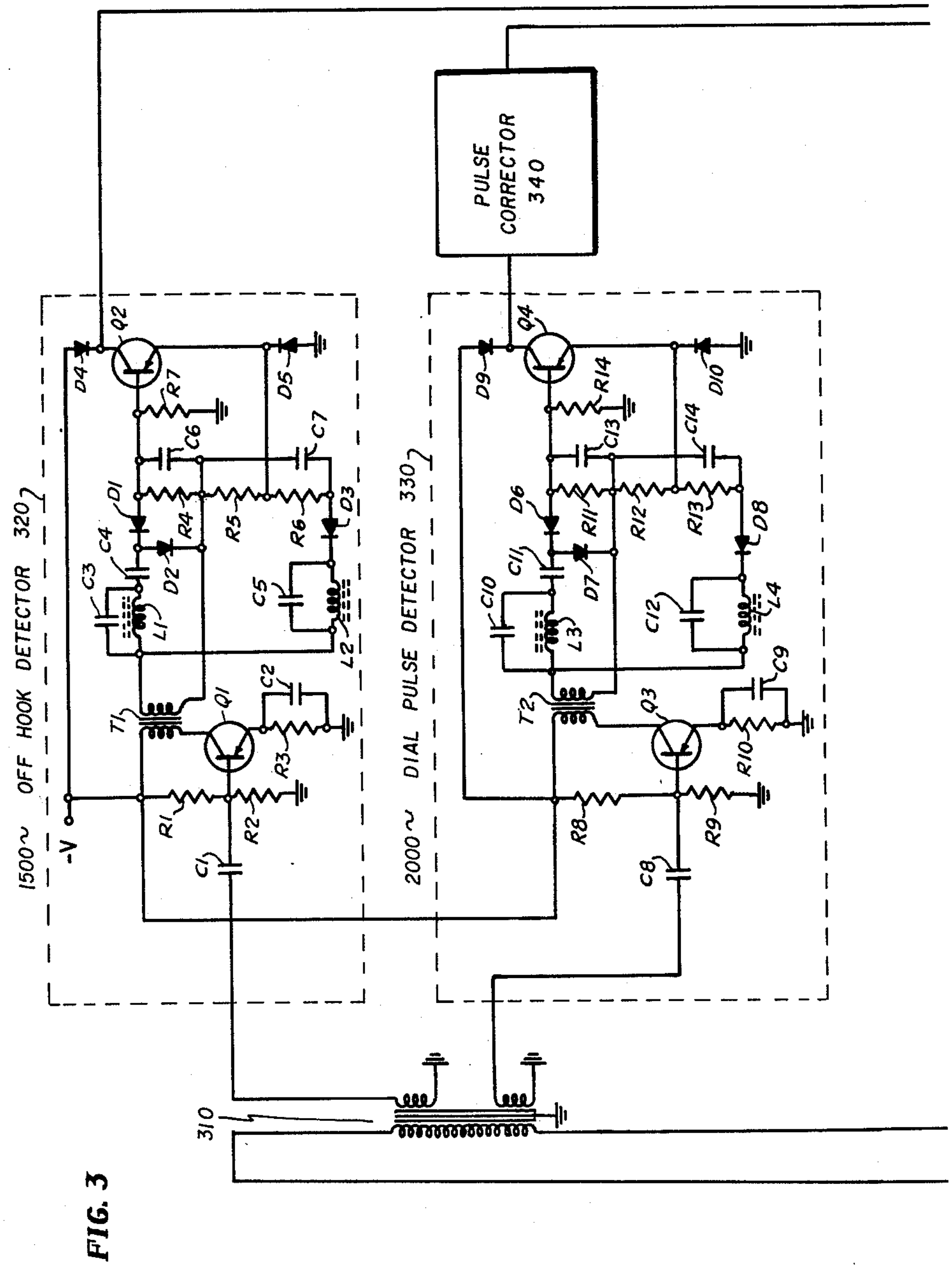
Figure 4:
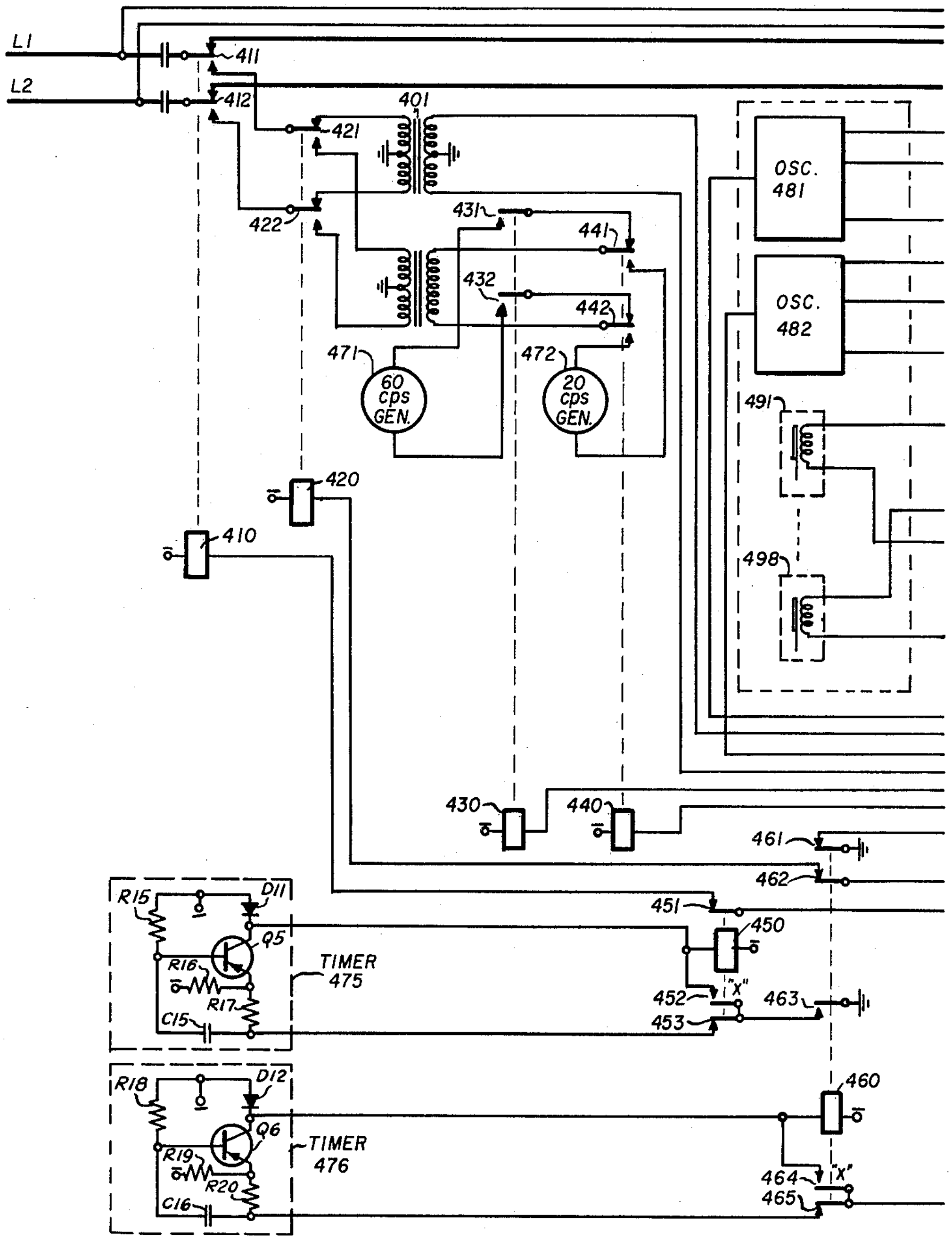
Figure 5:
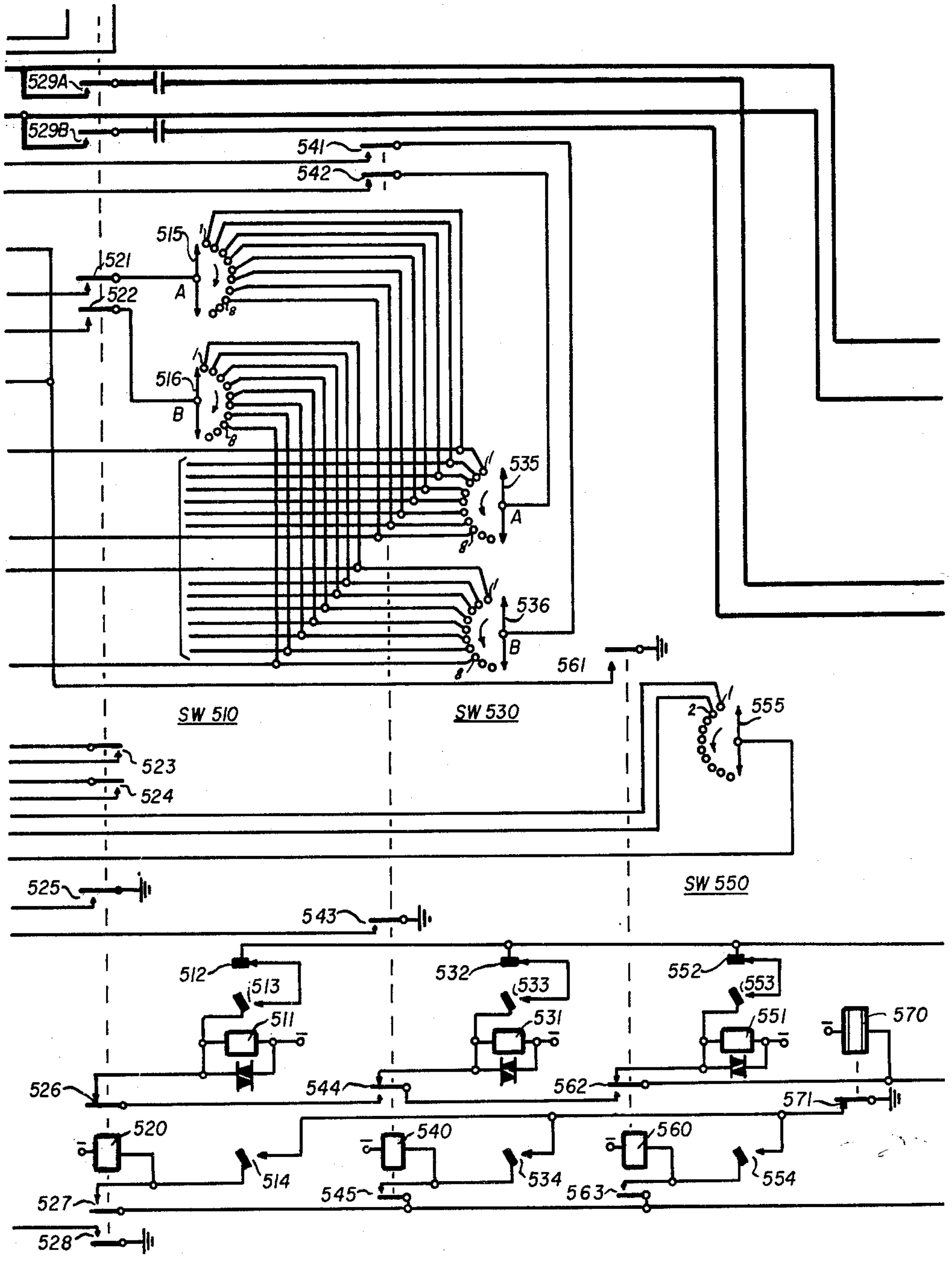
Figure 6:
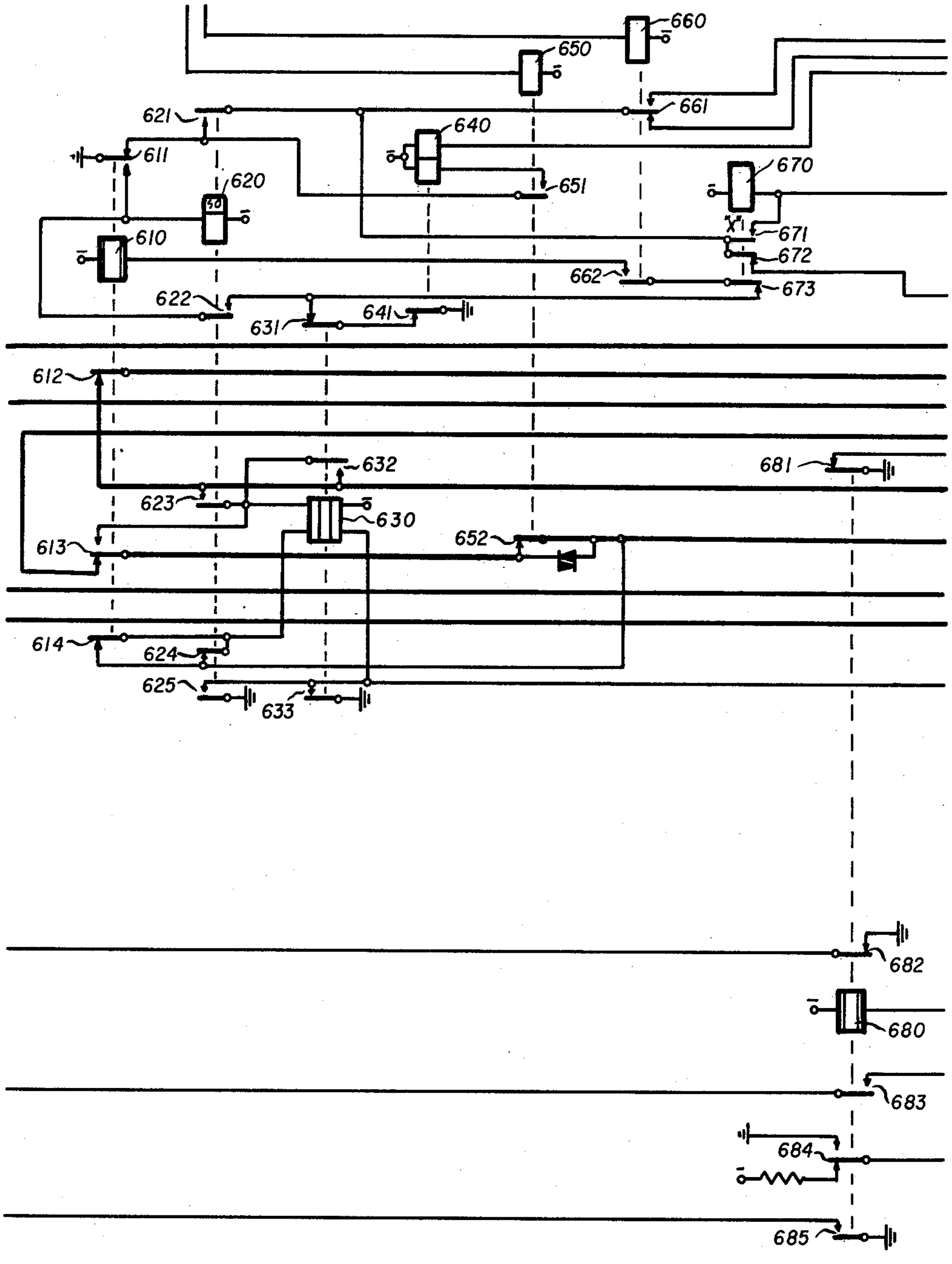
Figure 7:
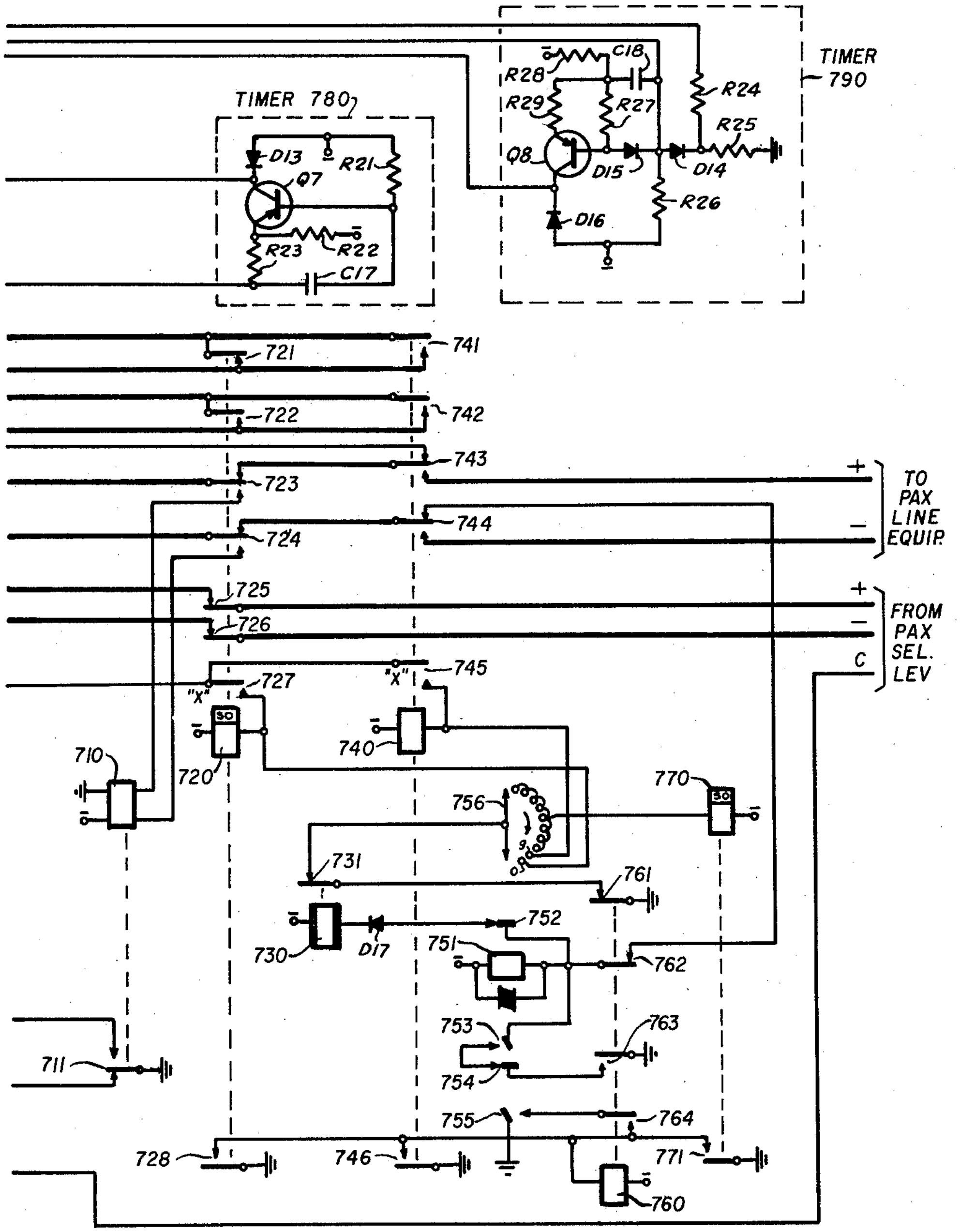

Generally described the waystation set is as shown in FIGURE 2. The telephone contains a transistorized oscillator 201, a high impedance traffic ringer 210, associated relays 220, 230 and 240, and the required interconnecting circuitry. The handset 260 is a push to talk local battery type. The two keys, dial key 290 and release key 295 are used to control the signal tones used for seizing and for releasing the system. The waystataion set is designed to operate from local dry cells of 12 volts for nominal distances of from 50 to 75 miles on conventional facilities. For increased distance the supply voltage may be increased to 15 volts. Power is required only during signalling and off hook condition. No standby power is required. Each waystation contains a 4 channel resonant reed relay 250. Since a two tone signalling combination is used to select a waystation, the additional channels permit the waystation selecting number to be changed by changing strappings on the relay. Each 4 channel resonant reed relay can thus provide any one of six combinations.

The waystation control unit shown in FIGURES 3, 4, 5, 6 and 7 in combination, contains the two incoming tone detectors 320 and 330 which convert the waystation pulse tones to conventional D.C. pulses necessary for operation of the dial switching equipment. Both of these detectors contain transistorized limiters to prevent overloading at their input. The tuned portion of the circuitry consists of series and parallel resonant circuits interconnected to bias the driver transistor. When a signal of proper frequency is detected the voltage of the series tuned circuit is rectified and used to operate the transistor. If a signal other than the desired frequency is received, the voltage of the parallel resonant circuit is rectified and used to back bias the driver transistor to a cutoff condition. When the proper frequency is present along with other signals then the circuit acts as a signal ratio detector. This ratio can be adjusted to any circuit conditions. The use of this type of circuitry practically eliminates the problem of signal limitation by means of voice.

A transistorized pulse corrector is connected to the output of the dial pulse detector 330. It is capable of correcting a "percent break" of anywhere from 5% to 95% to the 60% break necessary for pulsing of switches. A 1.5 minute instant reset timer 790 is provided to hold the line until the connection is completed. This timer is utilized to hold calls between waystations on different lines.

To seize the regular telephone equipment a preliminary digit must be dialed. This provision makes it possible to complete reverting calls independent of the waystation control equipment disclosed herein. The waystation control unit also includes frequency signal sources 471 and 472 with their associated timer 476 and the signalling frequency oscillators 481 and 482 with their timer 475 as well as the necessary remaining circuitry for signalling a waystation.

In the instant system three digits must be dialed to select a station. The first digit dialed selects the turn on frequency needed with the remaining two digits selecting the particular two tone frequency signal combination required for waystation selection.

Referring to FIGURES 2, 3, 4, 5, 6 and 7 in combination, I will first describe a call from the waystation number 1 shown in FIGURE 2, to a telephone subscriber in the telephone exchange. Station 1 includes an oscillator of known type which can be controlled to generate either 1500 or 2000 cycles per second tone signals in a manner similar to that shown in U.S. Patent 3,128,346 to R. P. Dimmer et al., issued April 7, 1964.

The subscriber at waystation 1 will first listen in on the line by means of receiver 262, connected to the line by the usual hookswitch 270 or a monitor key to see if the line is in use or if any other subscriber is dialing. If the line is not busy he will operate the dial key 290 for a short interval to close springs 291 and 292 to close the circuit to the waystation line at contacts 291 and to connect battery extended through hookswitch contacts 271 to lead L203 of the oscillator 201 to cause it to generate alternating current of 1500 cycles, transmitting these signals over leads L204 and L205 to the waystation line conductors L1 and L2. A battery path also extends through dial springs 281 and 282 to lead L202 of the oscillator. The oscillator generates 2000 cycles per second with battery connected to both leads L202 and L203 and 1500 cycles per second tone signals with battery connected only to lead L203.

When the waystation subscriber operates his dial key, 1500 cycle tone is transmitted over the line and is coupled to the off hook detector circuit 320 by means of transformer 310. The off hook detector 320 consists of a limiter circuit comprised of transistor Q1 and the associated biasing resistors R1, R2 and R3. Incoming signals coupled to the off hook detector by transformer 310 are coupled to the limiter portion of the 1500 cycle detector by capacitor C1. These signals are applied to the base of transistor Q1 which will conduct at the proper signal levels the incoming signals to transistor Q1 where they will be coupled to filter circuits consisting of a series filter comprising capacitor C3 and inductor L1 and a shunt filter comprising inductor L2 and capacitor C5. If the incoming signal is 1500 cycles, it will be coupled through capacitor C3 to transistor Q2 causing it to conduct. If the incoming signals are other than the desired frequency the voltage derived through the shunt filter will be applied to transistor Q2 causing it to cutoff.

Signals of 1500 cycles cause the transistor Q2 in the output of the detector to conduct extending ground to relay 660. Relay 660 operates as long as 1500 cycle tone is being transmitted from the waystation. Operation of relay 660 closes a path at contact 662 extending from ground through contacts 641, 631, 673, and 662 to the coil of relay 610, causing it to operate. At its contact 661 relay 660 prepares a circuit to the off hook timer 790.

Relay 610 on operation removes ground at contact 611 from the operating path of the off hook timer, extending this ground to relay 620 causing it to operate. Relay 620 on operating locks to ground at contact 622 and prepares bias paths for answer supervision relay 630 at contacts 631, 624, and 625. Relay 630 does not operate at this time. After the waystation operator releases his dial key transmission of 1500 cycle signal tone ceases. Relay 660 restores followed by relay 610. A path from ground through contacts 611, 621, and 661 exists to timer 790 which starts its operating cycle of 1.5 minutes. This timer is of conventional design. Initially the transistor Q8 will not conduct. If after a period of 1.5 minutes dialing has not started, as indicated by application of ground to resistor R24 capacitor C18 will fully charge and transistor Q8 will conduct causing ground to be extended to relay 640. If after 1.5 minutes, operation of the dial at the waystation has not started, timer 790 applies ground to relay 640 causing it to remove ground from relay 620 the only relay remaining still operated. Relay 620 now releases and breaks the operating path to the timer 790 at contact 621 causing relay 640 to restore and the entire circuit to return to normal.

Assume now that the waystation operator has proceeded with the placement of the call before the 1.5 minutes period has passed. Pulling the dial off normal to dial the first digit, 1500 cycle tone is again placed on the line and relays 610 and 660 reoperate. Timing by timer 790 also stops. As the dial is released 2000 cycle tone pulses in accordance with the digit dialed ("9" for PAX calls and "0" for calls on the waystation line) are transmitted from the waystation to the switching equipment. This is accomplished by the application of battery to leads L202 and 203 as previously noted. Tone is connected through the transformer 310 to detector 330 which detects the presence of 2000 cycle tone in a manner similar to that used for the detection of the 1500 cycle tone. Ground pulses in accordance with the input signals pulses extended from the transistor in dial pulse detector 330, to the pulse corrector 340. This pulse corrector which is capable of reshaping the incoming dial pulses to the proper form for usage by the switching equipment is similar to that disclosed in copending U.S. application of R. V. Burns and R. T. Cleary Serial No. 127,567 filed July 28, 1961. The corrected dial pulses operate relay 650. The pulsing contact 652 of relay 650 effectively break a ground path to motor magnet 751 of rotary switch 750 extended from ground through contacts 681, 743, 723, 623, 613, 652, 724, 744 and 762 to the motor magnet 751. Interruption of contacts 652 will cause the rotary switch to step in a self interrupted manner to the ninth position for placement of a telephone call to be made to the PAX.

With the dialing of the digit "9" to make a PAX call, ground now extends over contacts 761 and 731 to wiper 756 and thence over bank contacts 9 to relay 740 causing it to operate. Relay 740 on operation locks to ground at its "X" contact 745 by ground extended through contacts 625 of relay 620. Relay 740 now operates fully completing a connection between the incoming waystation line and PAX line equipment at contacts 741, 742, 743, and 744 respectively. Polar relay 630 bridges the line in anticipation of answer supervision. Dial tone is now returned from the PAX to the waystation over a connection just outlined. The subscriber at the waystation now operates his dial to complete the connection to a PAX subscriber.

In the manner outlined above the incoming dial pulses will be repeated by relay 650 pulsing the line at contact 652 to operate the PAX switching equipment in the usual manner. Upon answer by the called PAX subscriber the polarity of the line will be reversed in the usual manner causing relay 630 to operate locking to its contacts 633 and 632 across the telephone line and breaking the operating path to relay 620 at contact 631. The timing path to timer 790 is opened and at contacts 633 ground is returned to hold the connection between the waystation and the PAX by means of continued operation of relay 630. This ground is necessary inasmuch as the original ground to which relay 740 was locked was returned via contact 625. This ground is removed when relay 620 is deenergized. The conversation between the waystation subscriber and the PAX called party now commences. Upon completion of the call the called party restores his handset to the hookswitch, the line polarity is reversed and relay 630 restores removing ground at contact 633 from relay 740 rendering it inoperative. When relay 740 falls back the connection between the waystation line and the PAX line equipment is disconnected.

I will next describe means by which a PAX subscriber can place a call to a waystation subscriber. The PAX subscriber will operate his telephone instrument in the usual manner dialing the required digit for access of the waystation by means of a switch through connector or via a selector level. The switching equipment will extend the telephone connection from the PAX subscriber to the waystation control equipment in any well known manner completing a loop via the positive and negative line connectors and contacts 725 and 726 to relay 710 causing it to operate. Operation of relay 710 applies ground at contact 711 to relay 680 which in turn removes ground from the interrupter contacts of switches 510, 520 and 530, and at contact 682 completes an operating path to motor magnet 551 and relay 550 as well as relay 570. Resistance battery is removed at contact 684 from the "C" lead to the PAX replacing it instead with ground. Preparatory ground is also extended at contact 685 to the off normal springs of rotary switches SW510, SW530 and SW550 as well as to relays 520, 540 and 560. Ground is also removed at contact 681 prohibiting any future operation of relay 630. The PAX subscriber will now dial the first digit of the waystation with which he desires to converse.

Ground will be periodically applied at contact 711 in accordance with incoming dial pulses transmitted to relay 710. Because of its slow to release characteristics relay 680 will stay held during the dialing process and relay 570 will also hold because of its slow to release characteristics. Motor magnet 551 will operate in accordance with the dial pulses causing wiper 555 to step to bank contacts 1 or 2 in accordance with the appropriate digit transmitted by the PAX subscriber. Assume now that the first digit dialed is the digit "1". Ground is extended at contact 461 and wiper 555 to bank contact 1 and thence to relay 430.

Operation of relay 430 connects 60 cycle generator 471 at contacts 431 and 432 to the primary of transformer 402. At the completion of dialing of the first digit ground will be returned via contacts 571 and off normal springs 554 to relay 560. Relay 560 will then lock to an operating path at contacts 563 and extend the operating path to motor magnet 531 of rotary switch 530 at contact 562. Likewise ground will be extended at contact 561 to oscillators 481 and 482 in preparation for applying the distinctive tone signals used for seizing the desired waystation, to the line. The subscriber at the PAX will next operate his dial to the next desired digit. Again relay 710 will follow the dial pulses extending ground via contacts 711 and 683 to rotary switch magnet 531 in accordance with the digits transmitted. The rotary switch will step in the usual manner connecting one of the eight resonant circuits 491 to 498 via bank contacts on switch 530 and the associated wipers to oscillator 481. Assume that the second digit dialed was "1". Rotary switch 530 will step to the first bank contact connecting resonant circuit 491 via bank contacts 1 on levels A and B to wipers 535 and 536 respectively. At the completion of the digit transmission, relay 540 will operate in a manner similar to that previously outlined for relay 560. Operation of relay 540 will extend the connection from the wipers 535 and 536 to oscillator 481 at contacts 541 and 542. This selection of a resonant circuit will determine the frequency of the signal to be transmitted by oscillator 481. Operation of relay 540 also extended an operating path from the pulsing relay 710 to the motor magnet of switch 510 in preparation for reception of the next digit. Likewise ground is extended at contact 543 via contacts 451 to relay 410 causing it to operate. Operation of relay 410 connects the waystation line at contacts 411 and 412 to the secondary winding of transformer 401. The PAX subscriber will now dial the final digit causing rotary switch 510 to operate in the usual manner to connect another one of the resonant circuits to oscillator 482. Assume in this case the last digit dialed was 8. In a manner similar to that previously described resonant circuit 498 will now be connected via contacts 8 on levels A and B of rotary switch 510 to the wipers 515 and 516. Completion of the last digit will cause relay 520 to operate in a manner similar to that outlined for relays 540 and 560 to complete the connection of the resonant circuit 498 to oscillator 482 determining the second of the two selected frequencies used in signalling the waystation subscriber. Operation of relay 520 further extends output signals from oscillators 481 and 482 to the primary of transformer 401, so the signals may be transmitted over the waystation line. However at the same time ground is extended via contacts 525 and 462 to relays 420 causing it to operate disconnecting the transformer 401 from the waystation line and connecting transformer 402 in its place. The 60 cycle generator 471 will now transmit 60 cycle signals to the waystation line. Referring for a moment to FIGURE 2 the 60 cycle signals transmitted over the waystation line are received by traffic ringer 210, causing it to operate. Armature 211 extends ground to relay 220 causing relay 220 to operate at its "X" contacts 223. Relay 220 locks at its "X" contacts 223 to ground extended via contacts 241 completing an operating path for amplifier 240 and resonant reed relay 250 at contacts 222 and a coupling path for the incoming signal at contacts 221 so that they may be extended to amplifier 214 for amplification and resultant application to resonant reed relay 250.

As shown in this particular embodiment the selections are made initially between two groups of waystations having traffic ringers receptive to either 60 or 20 cycle generator. However it is obvious that additional frequencies other than, or in addition to, 20 or 60 cycles could be utilized in determining the initial waystation group of stations to be selected.

Operation of relay 520 also applies ground at contacts 523 and via contacts 465 to turn on timer 476. Timer 476 is of conventional design biased to cause transistor Q6 to conduct after such time as capacitor C16 charges fully. This timer allows a period of 5 seconds during which time the 60 cycle tone is transmitted over the waystation line to turn on the waystation equipment in the manner previously outlined. At the completion of 5 seconds the transistor Q6 of timer 476 becomes conductive extending a ground to relay 460. Relay 460 operates locking to ground at its "X" contacts 464 and breaking the operating path to timer 476. Likewise ground is removed at contacts 461 from relay 430 or 440 disconnecting the "turn on" frequency generator 471 or 472. Ground is also broken at contacts 462 restoring relay 420. When relay 420 restores the waystation line is again connected at contacts 421 and 422 to the secondary of transformer 401. The signals produced by oscillators 481 and 482 are now connected to the waystation line. These signals are then transmitted via the waystation line to all the waystations having traffic ringers actuated by the 60 cycle generator signal. However only one of the group of stations effectively "turned on" has its resonant reed relay 250 tuned to be receptive to the two signals now being transmitted by oscillators 481 and 482. Operation of relay 460 also applied ground at contacts 463 and via contacts 453 to signalling timer 475. After a 5 second interval during which the two signalling tones are transmitted over the waystation line the transistor Q5 of timer 475 which operates in a manner similar to that outlined in connection with timer 476, becomes conductive extending ground to relay 450 causing it to operate at its "X" contacts 452. Relay 450 then operates fully locking to ground at its "X" contacts 452 disconnecting the operating path to signalling timer 475 at contacts 453 and releasing relay 410 by breaking its path to ground at contacts 451. Relay 410 releases and transformer 401 secondary becomes disconnected from the waystation line and the waystation line is now connected at contacts 411 and 412 to the circuit connection extending to the PAX which was completed at contacts 529A and 529B when relay 520 was operated.

At the selected waystation resonant reed relay 250 will operate in response to the two selected frequencies to connect battery to transistor switches 215 and 216. These switches are of any conventional design, and in turn will operate in response to battery, to operate two winding relay 230. Relay 230 in turn operates at its contacts 231 to operate buzzer 212 and in order to complete a circuit to some other audible signal, closes contacts 232. At the same time relay 230 operates timer 213 which after a space of approximately 5 seconds will extend ground to relay 240 causing it to operate, removing operating ground from relay 220 at contacts 241 which in falling back also removes ground at contacts 225 from relay 230 rendering it inoperative. Likewise when relay 230 is rendered inoperative ground is removed at contacts 231 from the buzzer 212 and the circuit to the audible signal is also broken at contacts 232. Resonant reed relay 250 and its associated amplifier and transistor switches 215 and 216 are also disconnected from the line by restoration of relay 220 which opens the control path at contacts 221 and 222. If the waystation subscriber replies before incoming signalling has terminated conversation cannot commence because the line to the waystations subscriber's handset is open at contacts 224, on completion of ringing this circuit path is restored.

If the waystation subscriber does not respond after an ordinary interval, the PAX subscriber would then hang up at which time relay 710 would release by removal of ground from relay 680. Relay 680 would then restore and at its contacts 685 remove holding ground from relays 560, 540 and 520 causing them to restore. In turn restoration of relay 520 would remove ground at contacts 528 from relay 460 causing it to restore. Restoration of relay 460 removes ground at contacts 463 from relay 450 causing it to restore, thus returning all relays to normal while the return of ground at contacts 682 to the interrupter springs of switches 510, 530 and 550 will cause these switches to return to home in a self interrupted. The circuit is now at rest awaiting another call. If the subscriber at the waystation does reply, at the completion of conversation he too must break the line loop that now extends back to relay 710 and this is accomplished by operation of release key 295. Operation of release key will place a 2000 cycle tone of long duration on the line where it may be detected in a manner previously outlined and cause operation of the timer circuitry which will in effect release the waystation line from the associated switching circuitry.

If a waystation desires to contact another waystation on the same line the operation initially would be the same as when the waystation subscriber places a call to a PAX subscriber. However on dialing the first digit instead of dialing "9" as is the case for a PAX subscriber the waystation operator will now dial a "0" after which ground would be extended to relay 720. Relay 720 will operate connecting the line circuit back to itself at contacts 721, 722, 723, and 724 as well as disconnecting the PAX access to the equipment at contacts 725 and 726. Relay 720 locks to operating ground at its "X" contact 727 as well as returning ground at contacts 728 to relay 760 to effectively disconnect rotary switch 750 from further operation by relay 760. When relay 720 was operated relay 710 was bridged across the line at contacts 723 and 724 and it will now respond to dial pulses received from the waystation, in a manner similar to that previously described. The waystation subscriber will now dial the desired digits identifying the other waystation subscriber to be contacted and the remaining switching equipment will operate in a manner identical to that previously described.

What is claimed is:

1. In a communication system, a waystation line, a plurality of waystations connected thereto each including a calling device, waystation control means terminating said waystation line, an automatic telephone exchange including a plurality of subscriber lines each including a calling device, and including a plurality of automatic switches controlled by dial impulses to extend a plurality of different connections including a connection to said waystation control means, said waystation control means comprising:

tone signaling means including a plurality of first tone signal sources and a plurality of second tone signal sources; switching means connected to said telephone exchange by said extended connection and connected to said waystation line, operated in response to dial impulses received from said telephone exchange or from one of said waystations to selectively connect one of said first tone signal sources and plurality of said second tone signal sources to said waystation line to transmit a plurality of selected signal tones over said waystation line;

and each of said waystations further including, subscriber signaling means; a first tone responsive circuit connected to said waystation line; and a second tone responsive circuit connected to said subscriber signaling means, said first tone responsive circuit operated in response to the tone signal from the selected one of said first tone signal sources to extend said waystation line to said second tone responsive circuit and condition said second tone responsive circuit, said conditioned second tone responsive circuit operated in response to said plurality of selected second tone signals to operate said subscriber signaling means to signal a subscriber at said waystation.

2. A communication system as claimed in claim 1 wherein said plurality of first tone signal sources comprise a plurality of ringing generators; said plurality of second tone signalling sources comprise a plurality of oscillator circuits; said first tone responsive circuit comprises a traffic ringer including a secondary winding for inductive coupling of signals transmitted to said ringer to said second tone responsive circuit; and said second tone responsive circuit comprises a resonant reed relay operated in response to said plurality of second tone signals transmitted over said waystation line and coupled through said traffic ringer.

3. A communication system as claimed in claim 1 wherein said tone signalling means further include a plurality of frequency determining circuits each adapted to be selectively connected to one of said second tone signal sources by said switching means for determination of the frequencies of the tone signals generated by said second tone signal sources.

4. A communication system as claimed in claim 3 wherein said frequency determining circuits comprise a plurality of inductances each resonant at a different predetermined audio frequency.

5. A communication system as claimed in claim 1 wherein said switching means include: a first automatic switch operated in response to dial impulses to select one of said first plurality of first tone signal sources; a second automatic switch operated in response to dial impulses to selectively connect one of said plurality of frequency determining circuits to one of said second tone signal sources, and a third automatic switch operated in response to dial impulses to selectively connect another one of said plurality of frequency determining circuits to another one of said second tone signal sources and connect said selected first tone signal source to said waystation line.

6. A communication system as claimed in claim 1 wherein said switching means further include a selecting switch connected to said waystation line operated in response to dial impulses representative of a first preselected digit received from one of said waystations to connect said waystation line to said automatic telephone exchange, and operated in response to dial impulses representative of a second preselected digit to connect said waystation line to said first automatic switch.

7. In a communication system as claimed in claim 1 wherein said waystation control means further include: a first timer connected to said third automatic switch, operated after a predetermined period of time in response to operation of said third automatic switch to disconnect said first tone source and connect said plurality of second tone sources to said waystation line; a second timer connected to said first timer, operated after a predetermined period of time in response to operation of said first timer to disconnect said second tone sources; said waystation further including: a third timer connected to said second tone responsive circuit operated after a predetermined period of time in response to operation of said second tone responsive circuit to render said first and said second tone responsive circuits inoperative.

8. A communication system as claimed in claim 7 wherein said first and second timers each include a transistor switch having an input comprising a resistance capacitance network of predetermined time constant, and an output comprising a relay.

References Cited in the file of this patent

UNITED STATES PATENTS

| | | |
|---|---|---|
| 2,826,639 | Pharis | Mar. 11, 1958 |
| 2,843,673 | Kaye | July 15, 1958 |
| 3,026,377 | Sullivan | Mar. 20, 1962 |
| 3,041,402 | Dimmer | June 26, 1962 |